United States Patent
Wang et al.

(10) Patent No.: US 7,979,961 B2
(45) Date of Patent: Jul. 19, 2011

(54) HINGE ASSEMBLY FOR AN ELECTRONIC DEVICE

(75) Inventors: Jin-Xin Wang, Shenzhen (CN); Gui-Li Yang, Shenzhen (CN); Liang Wei, Shenzhen (CN); Li-Jun Yuan, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 289 days.

(21) Appl. No.: 12/261,232

(22) Filed: Oct. 30, 2008

(65) Prior Publication Data
US 2010/0005626 A1  Jan. 14, 2010

(30) Foreign Application Priority Data

Jul. 8, 2008  (CN) .......................... 2008 1 0302652

(51) Int. Cl.
*E05D 3/10* (2006.01)
(52) U.S. Cl. ................ 16/367; 16/337; 16/340
(58) Field of Classification Search .......... 016/337–339, 016/342, 330, 303, 374, 376, 377, 340, 367; 361/679.12, 679.06, 679.07; 455/90.3, 575.1, 455/575.3, 575.8; 379/433.12, 433.13; 348/373, 348/333.01, 333.06, 794
See application file for complete search history.

(56) References Cited

U.S. PATENT DOCUMENTS

| 7,024,729 | B2* | 4/2006 | Chang et al. ..................... 16/367 |
| 7,189,023 | B2* | 3/2007 | Kang et al. ..................... 403/119 |
| 7,526,835 | B2* | 5/2009 | Chen ............................... 16/367 |
| 7,621,021 | B2* | 11/2009 | Hsu et al. ........................ 16/367 |
| 7,797,797 | B2* | 9/2010 | Chiang et al. ................... 16/367 |
| 2008/0034549 | A1* | 2/2008 | Lee et al. ........................ 16/367 |
| 2009/0121094 | A1* | 5/2009 | Chang et al. ............... 248/125.7 |

* cited by examiner

Primary Examiner — Chuck Y. Mah
(74) Attorney, Agent, or Firm — Clifford O. Chi (57) ABSTRACT

A hinge assembly includes a first rotating module and a second rotating module. The first rotating module includes a frame and a pivot mechanism positioned on the frame. The second rotating module includes a supporting body, a shaft, a rotating washer, a stationary washer, a resilient ring, and a nut. A first end of the shaft is fixed on the frame, and the supporting body, the rotating washer, the stationary washer, the resilient ring, and the nut are orderly sleeved on a second end, opposite to that of the first end, of the shaft. The nut fixes the supporting body, the rotating washer, the stationary washer, and the resilient rings to the shaft. The rotating washer and the stationary washer forms at least one protrusion and at least one depression for receiving the at least one protrusion respectively. The pivotal shaft is configured to drive the stationary washer to rotate.

8 Claims, 5 Drawing Sheets

HINGE ASSEMBLY FOR AN ELECTRONIC DEVICE

BACKGROUND

1. Technical Field

The present disclosure relates to a hinge assembly, and particularly to a hinge assembly employed in an electronic device, such as a notebook computer.

2. Description of the Related Art

An electronic device such as a mobile phone, a notebook computer or a personal digital assistant generally has a main body and a display body (or panel) pivotally mounted on the main body by a hinge. With a hinge, the display body can only be rotated about a horizontal axis in order to change a viewing angle, and cannot be rotated left or right. In particular, a liquid crystal display of a notebook computer may inherently have a narrow range of viewing angles. A person who wants to view the monitor needs to adjust the position of the notebook computer so that he/she is directly in front of the monitor, otherwise he/she may not be able to clearly see images displayed by the liquid crystal display. Thus, if a user wants to show the images displayed on the monitor to another person next to himself/herself, he/she needs to move the whole notebook computer left or right. That is, a notebook computer with a typical hinge can be quite inconvenient to use.

Therefore, a hinge assembly to solve the aforementioned problems is desired.

SUMMARY

A hinge assembly includes a first rotating module and a second rotating module. The first rotating module includes a frame and a pivot mechanism positioned on the frame. The second rotating module includes a supporting body; a pivotal shaft having a deformed shaft portion, a rotating washer, a stationary washer, a resilient ring, and a fixing element. A first end of the pivotal shaft is fixed on the frame, and the supporting body, the rotating washer, the stationary washer, the resilient ring, and the fixing element are sleeved on a second end, opposite to that of the first end, of the pivotal shaft in that order. The fixing element prevents the supporting body, the rotating washer, the stationary washer, and the resilient rings from detaching from the pivotal shaft. One of the first rotating washer or the first stationary washer forms at least one protrusion, and the other washer defines at least depression for receiving the at least one protrusion. The first pivotal shaft is configured to drive the first stationary washer to rotate Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge assembly. Moreover, in the drawings, like reference numerals designate corresponding parts throughout several views, and all the views are schematic.

DETAILED DESCRIPTION

Reference will now be made to the drawings to describe one embodiments of the present hinge assembly in detail.

Figure 1:
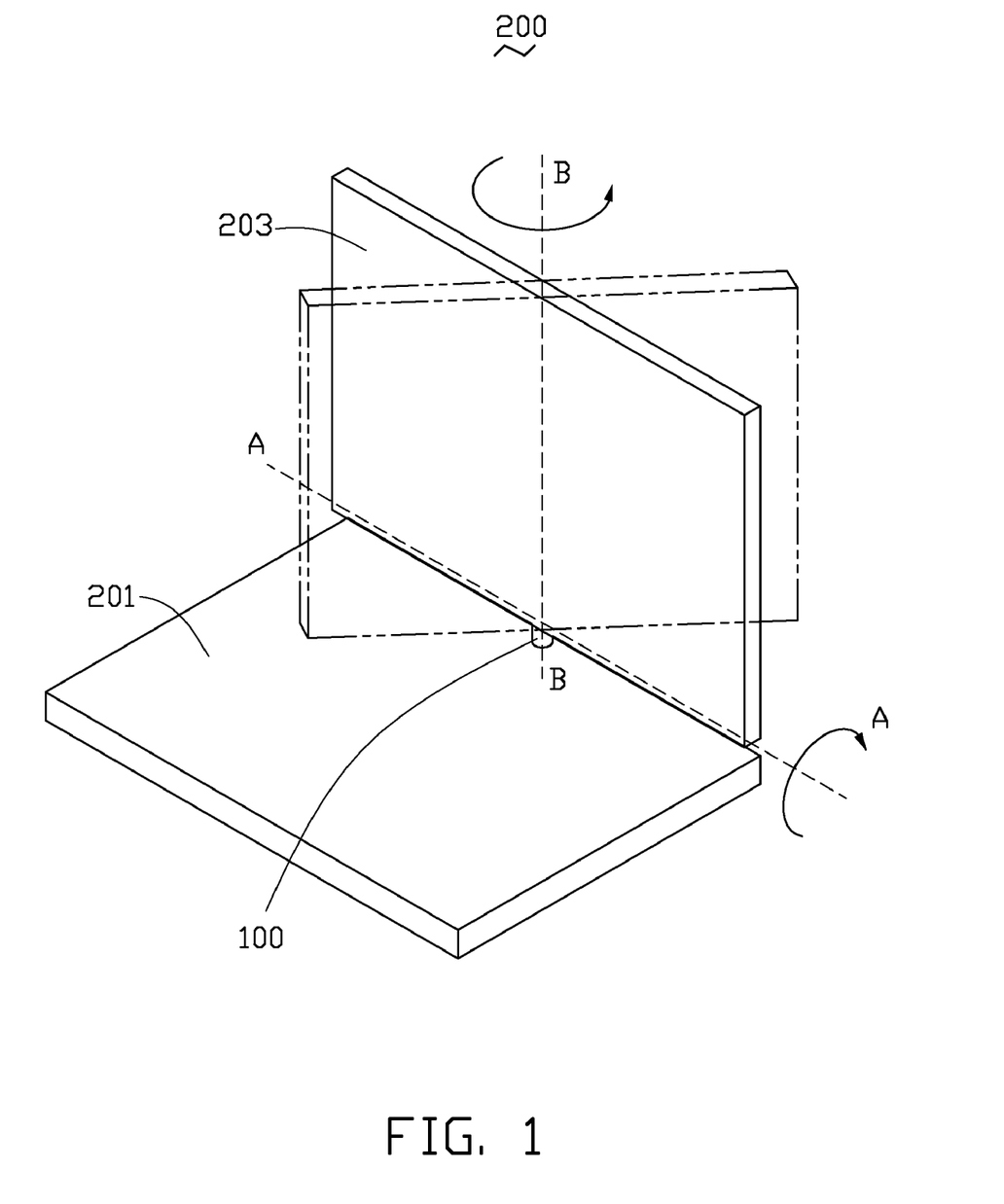
FIG. 1 is a notebook computer including a hinge assembly of the present invention when the display body of the notebook computer is rotated.

Referring to FIG. 1, a hinge assembly 100 which may be employed in a electronic device, such as a notebook computer 200 is shown. The notebook computer 200 includes a main body 201, a display body 203, and the hinge assembly 100. The hinge assembly 100 is positioned between the main body 201 and the display body 203 to connect the display body 203 to the main body 201 such that the display body 203 is capable of rotating relative to the main body 201 along the first line A-A and the second line B-B.

Figure 2:
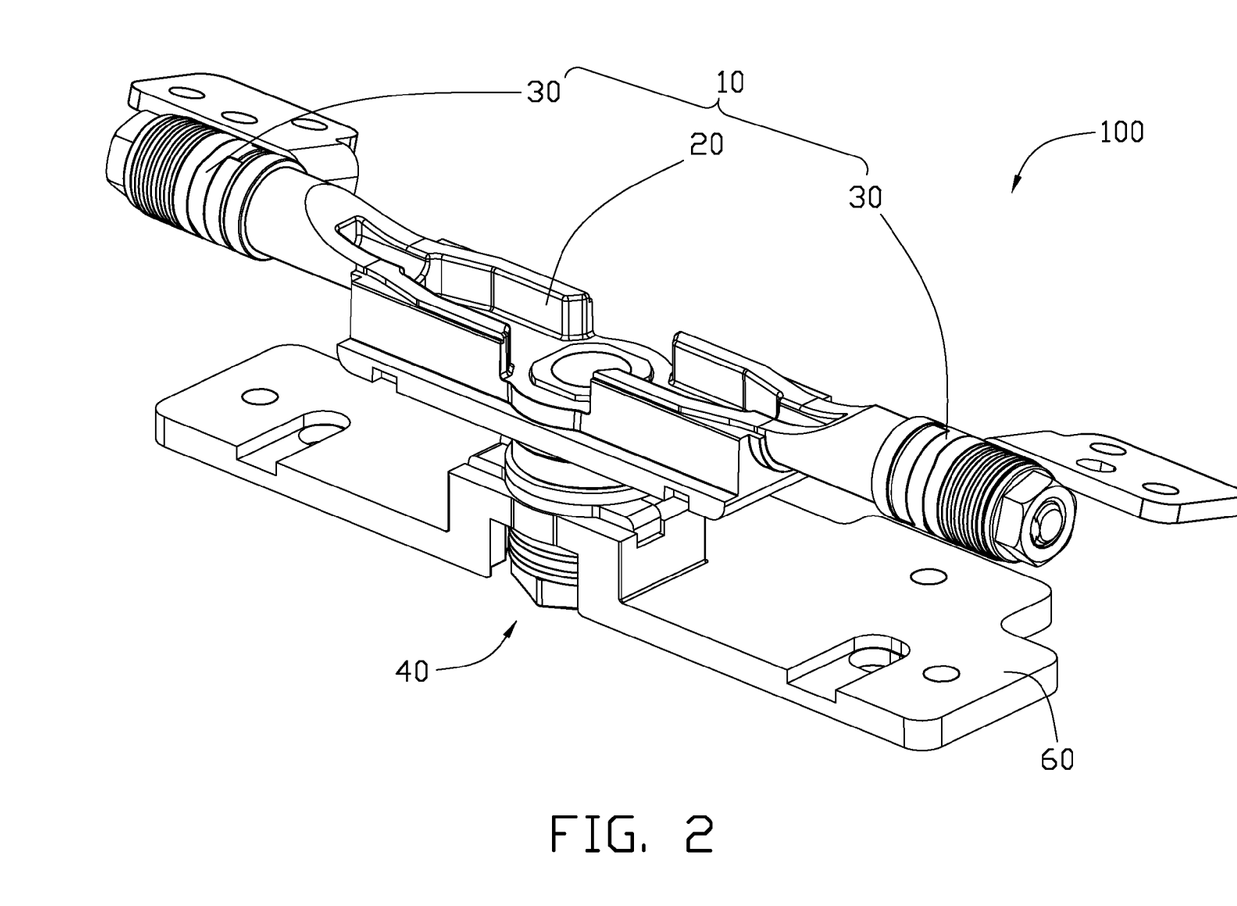
FIG. 2 is an assembled, isometric view of the hinge assembly in FIG. 1.

Referring to FIG. 2, the hinge assembly 100 includes a first rotating module 10 and a second rotating module 40. The first rotating module 10 includes a frame 20 and two pivot mechanisms 30 positioned on two ends of the frame 20 respectively.

Figure 3:
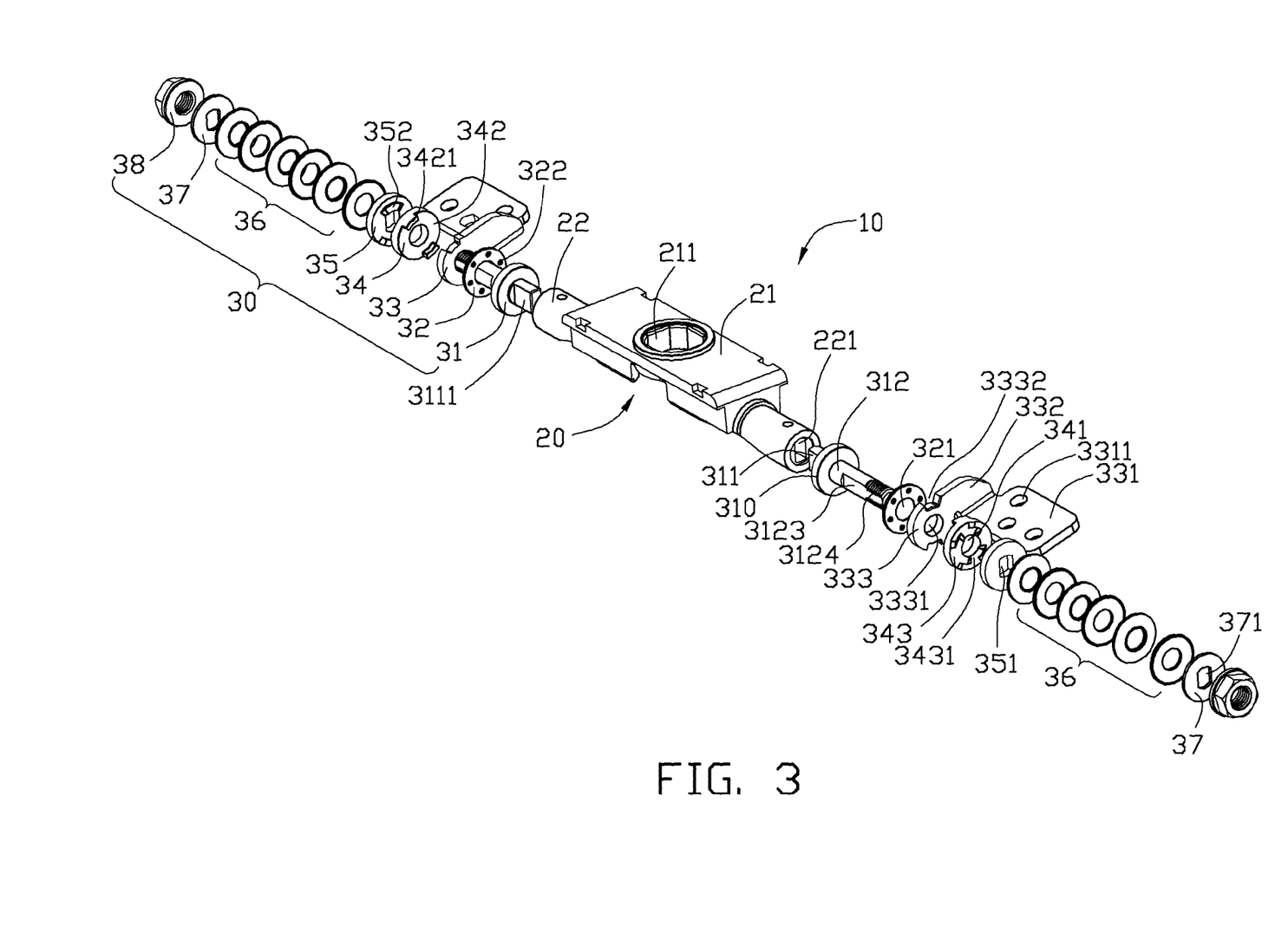
FIG. 3 is an exploded, isometric view of the first rotating module in FIG. 2.

Referring to FIG. 3, the frame 20 includes a flat portion 21 and two mounting portions 22 formed on two ends of the flat portion 21 respectively. The flat portion 21 defines a through hole 211 in a middle portion of the flat portion 21. Each of the mounting portions 22 defines an assembly hole 221.

The pivot mechanism 30 includes a pivotal shaft 31, a first washer 32, a connecting member 33, a rotating washer 34, a stationary washer 35, a plurality of resilient rings 36, a second washer 37, and a fixing element 38.

The pivotal shaft 31 includes a flange 310, a protrusion 311, and a shaft portion 312. The protrusion 311 and the shaft portion 312 are on opposite sides of the flange 310. The flange 310 is substantially disk-like in shape. The shaft portion 312 defines a thread 3124 on a distal end portion opposite to the flange 310. A cross section of the shaft portion 312 is non-circular. In this embodiment, the shaft portion 312 is flattened along a section of a cylindrical surface area thereof, thus forming a flat surface 3123, thereby forming a deformed shaft portion.

The first washer 32 is substantially ring-shaped, and defines a circular through hole 321 in a middle portion. The circular through hole 321 of the first washer 32 is configured for rotatably engaging with the shaft portion 312. In addition, the first washer 32 defines a plurality of oil holes 322. The oil holes 322 are configured for storing lubricating oil.

The connecting member 33 includes a fixing portion 331, a connecting portion 332, and an extending portion 333. The connecting portion 332 is perpendicular to the fixing portion 331. The extending portion 333 is formed on one end of the connecting portion 332 and is substantially ring-shaped. The fixing portion 331 is substantially shaped as a rectangular plate. The fixing portion 331 defines a plurality of assembly holes 3311, thereby the connecting member 33 is able to be easily fixed on the display body 203. The extending portion 333 defines a through hole 3331. Additionally, a periphery of the extending portion 333 defined two symmetrical latching grooves 3332.

The rotating washer 34 is substantially ring-shaped, and defines a circular through hole 341 in a middle portion thereof. The rotating washer 34 includes a first surface 342 and a second surface 343. The first surface 342 and the second surface 343 are formed on opposite sides of the rotating washer 34. A periphery of the first surface 342 forms two latching tabs 3421. The latching tabs 3421 are configured to be latched in the latching grooves 3332. The rotating washer 34 defines a plurality of the wedge groove 3431 in the second surface 343.

The stationary washer 35 is substantially ring-shaped, and defines a deformed through hole 351 in a middle portion thereof. A shape of the deformed through hole 351 matches a cross section of the shaft portion 212. Additionally, one side surface of the stationary washer 35 forms a plurality of wedge blocks 352. The wedge blocks 352 are configured to engage in the wedge grooves 3431 such that the rotating washer 34 and stationary washer 35 can remain in stable position so that the display body 203 can remain in a stable position.

Furthermore, the wedge block 352 may also be formed on the rotating washer 34, and the wedge groove 3431 may also be defined in the stationary washer 35.

The resilient rings 36 are substantially ring-shaped, and are placed around the shaft portion 312. A middle portion of each resilient ring 36 protrudes toward one side thereof. The resilient rings 55 are configured to provide an axial force (see below).

The second washer 37 is substantially ring-shaped and defines a deformed hole 371 in middle portion thereof.

In one embodiment, the fixing element 38 may be a nut. The fixing element 38 is configured for engaging with the thread 3124 of the pivotal shaft 31 so that the first washer 32, the connecting member 33, the rotating washer 34, the stationary washer 35, the resilient rings 36, and the second washer 37 are prevented from disengaging from the pivotal shaft 31.

Figure 4:
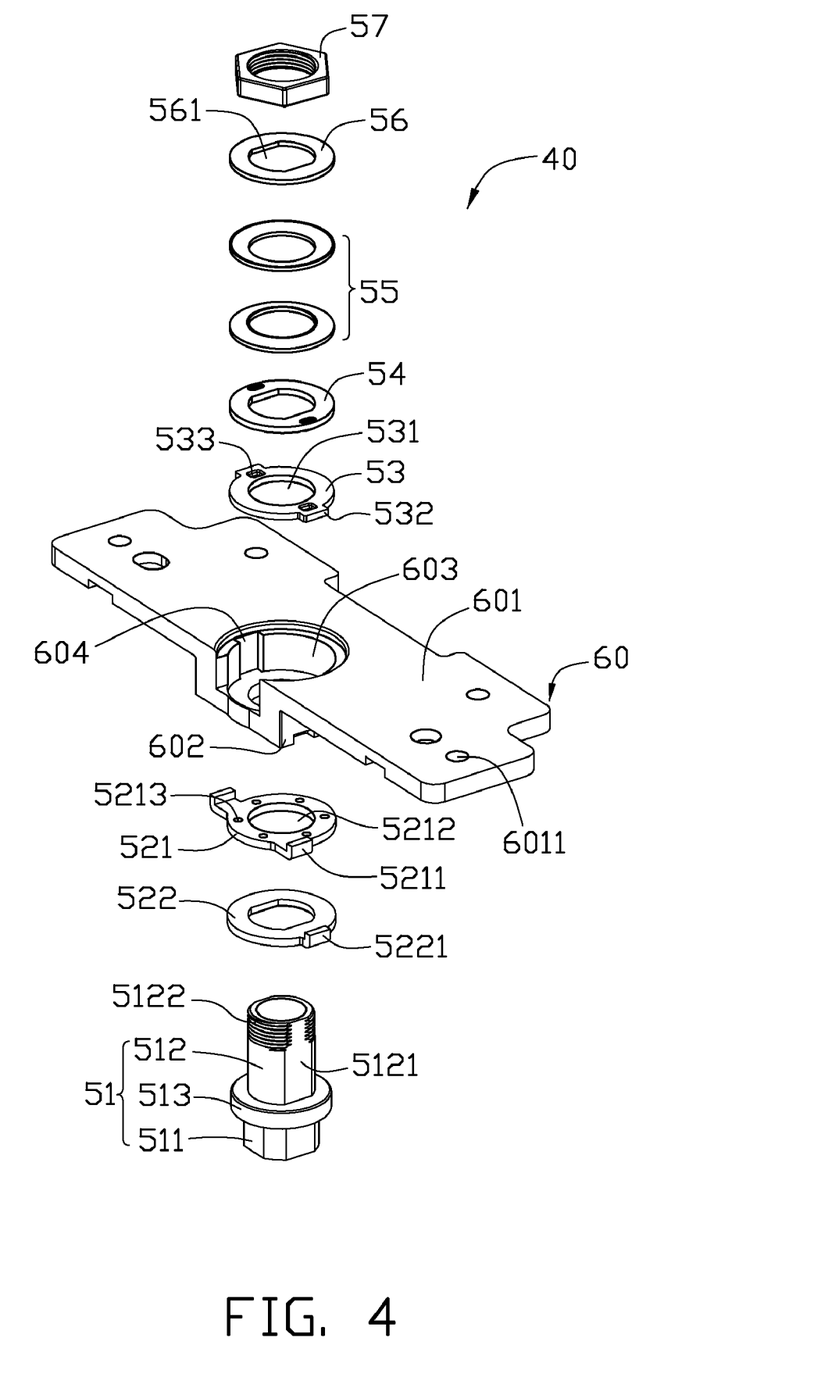
FIG. 4 is an exploded, isometric view of the second rotating module in FIG. 2.
Figure 5:
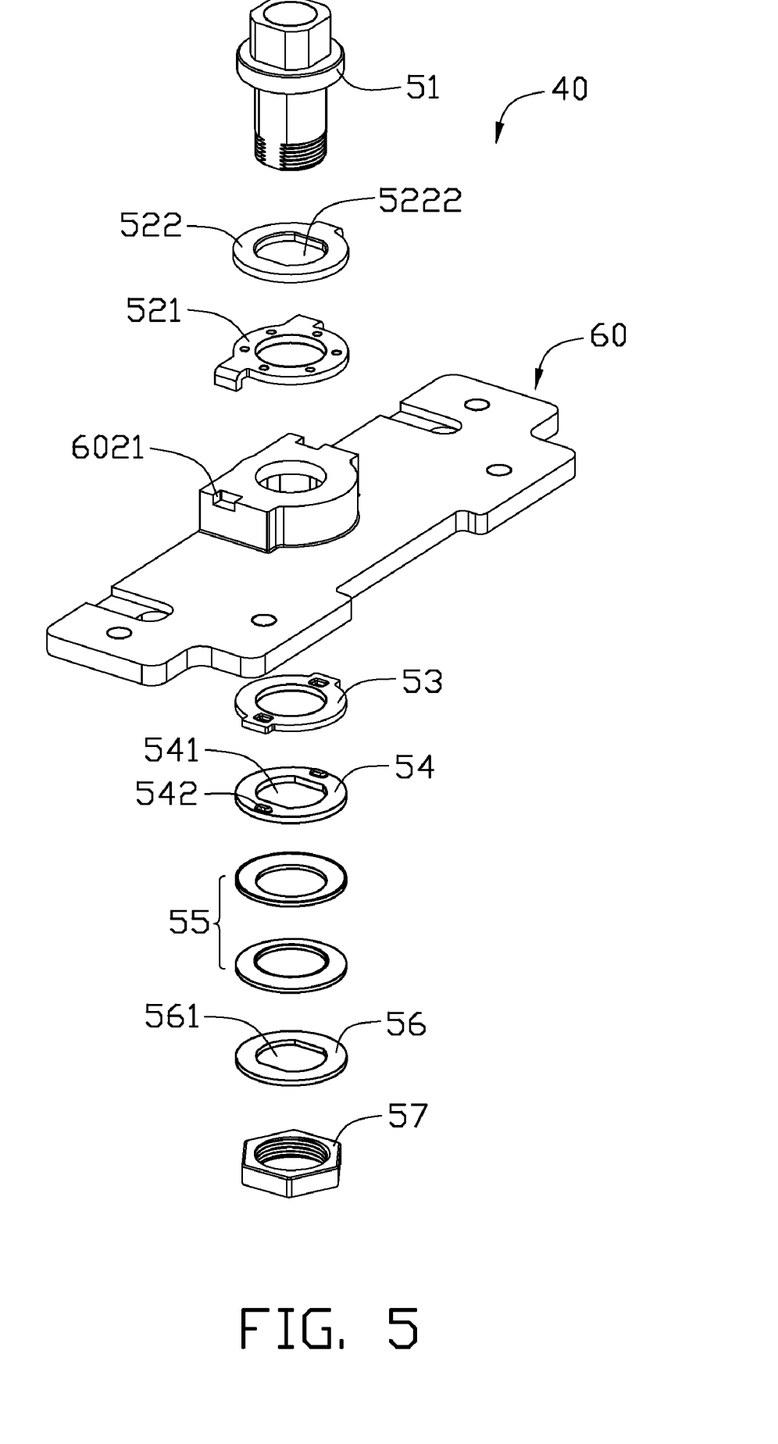
FIG. 5 is similar to the FIG. 4, but shows a view of the second rotating module from another aspect.

Referring to FIGS. 4 and 5, the second rotating module 40 includes a supporting body 60, a pivotal shaft 51, a first limiting washer 521, a second limiting washer 522, a rotating washer 53, a stationary washer 54, two resilient rings 55, a washer 56, and a fixing element 57.

The supporting body 60 includes a flat portion 601 and a connecting portion 602 perpendicularly extending from a middle portion of the flat portion 601. The connecting portion 602 is substantially shaped as a cylinder. The supporting body 60 defines a receiving hole 603 communicating between the flat portion 601 and the connecting portion 602. The receiving hole 603 is a stepped through hole. One end of the receiving hole 603 is larger than the other end of the receiving hole 603. The smaller end of the receiving hole 603 is adjacent to the flat portion 601. An inner side of the smaller end of the receiving hole 603 defines two symmetrical depressions 604. In addition, the flat portion 601 defines a plurality of assembly holes 6011, and the connecting portion 602 defines a plurality of latching grooves 6021.

The pivotal shaft 51 includes a flange 513, a protrusion 511, and a shaft portion 512. The protrusion 511 and the shaft portion 512 are on opposite sides of the flange 513. The flange 513 is substantially disk-like in shape. The shaft portion 512 defines a thread 5122 on a distal end portion opposite to the flange 513. A cross section of the shaft portion 512 is non-circular. In this embodiment, the shaft portion 512 is flattened along a section of a cylindrical surface area thereof, thus forming a flat surface 5121.

The first limiting washer 521 is substantially ring-shaped. A periphery of the first limiting washer 521 forms two limiting latching tabs 5211. Additionally, the first limiting washer 521 defines a circular hole 5212 in middle portion thereof. The limiting latching tab 5211 is configured to latch in the latching grooves 6021 of the supporting body 60. In addition, the first limiting washer 521 also defines a plurality of oil holes 5213. The oil holes 5213 are configured for storing lubricating oil.

The second limiting washer 522 is substantially ring-shaped. A periphery of the second limiting washer 522 forms a tab 5221. The second limiting washer 522 defines a deformed hole 5222 in middle portion thereof. A shape and a size of the deformed hole 5222 corresponds to a shape and a size of the shaft portion 512, thereby the second limiting washer 521 is non-rotatably sleeved on the shaft portion 512.

The rotating washer 53 is substantially ring-shaped. The rotating washer 53 defines a circular hole 531 in a middle portion thereof. In addition, the rotating washer 53 forms a plurality of tabs 532 extending from a periphery thereof. The rotating washer 53 also defines two depressions 533 adjacent to the two tabs 532 respectively. Each depression 533 forms a slanted surface (not labeled). The tabs 532 are able to latch in the depressions 604 such that the rotating washer 53 is non-rotatably received in the receiving hole 603 of the supporting body 60.

The stationary washer 54 is substantially ring-shaped. The stationary washer 54 defines a deformed hole 541 in a middle portion thereof. A shape of the deformed hole 541 is similar to that of a cross section of the shaft portion 512, and a maximal outer diameter of the shaft portion 512 is smaller that a maximal inner diameter of the deformed hole 541 such that the stationary washer 54 is non-rotatably sleeved on the shaft portion 512. In addition, one surface of the stationary washer 54 forms two protrusions 542. The protrusions 542 are configured to engage in the depression 533 of the rotating washer 53.

The resilient rings 55 are substantially ring-shaped, and are placed around the shaft portion 352. A middle portion of each resilient ring 55 protrudes toward one side thereof. The resilient rings 55 are configured to provide an axial force.

The washer 56 defines a deformed hole 561 in middle portion thereof.

The fixing element 57 is a hexagonal nut in one embodiment. The fixing element 57 is configured for engaging with the thread 5122 of the pivotal shaft 51 so that the rotating washer 53, the stationary washer 54, the resilient rings 55, and the washer 56 are prevented from disengaging from the pivotal shaft 51.

To assemble the notebook computer 200, following steps are provided.

To assemble the first rotating module 10. The protrusion 311 is inserted into the assembly hole 221, then the first washer 32, the connecting member 33, the rotating washer 34, the stationary washer 35, the resilient rings 36, and the second washer 37 are sequentially sleeved on the shaft portion 312. The latching tab 3421 is latched in the latching grooves 3332. The fixing element 38 is detachably fixed on the thread 3124 of the shaft portion 312, thereby preventing the first washer 32, the connecting member 33, the rotating washer 34, the stationary washer 35, the resilient rings 36, and the second washer 37 from detaching from the pivotal shaft 31.

To assembly the second rotating module 40. The shaft portion 512 is passed through the second limiting washer 522, the first limiting washer 521, the receiving hole 603, the washer 53, the stationary washer 54, the resilient rings 55, and the washer 56 in that order, and finally the fixing element 57 is detachably fixed on the shaft portion 512, thus prevent the rotating washer 53, the stationary washer 54, the resilient rings 55, and the washer 56 detaching from the pivotal shaft 51. The limiting latching tabs 5211 of first limiting washer 521 are latched in the latching grooves 6021, the tabs 532 of rotating washer 53 are latched in the depressions 604. In addition, the axial force can be adjusted by rotating the fixing element 57.

The first rotating module 10 is fixed on the second rotating module 40. The protrusion 511 is engaged in the through hole 211, thus yielding the hinge assembly 100 shown in FIG. 2.

The hinge assembly 100 is fixed on the display body 203 and the main body 201. The fixing portion 331 is connected to the display body 203, and the flat portion 601 is connected the main body 201, thus yielding the notebook computer 200 shown in FIG. 1.

In use, when a force is applied on the display body 203 to rotate the display body 203 relative to the first line A-A, the display body 203 drives the connecting member 33 to rotate relative to the frame 20, the pivotal shaft 31, and the main body 201. When rotating, because of the axial force from the resilient rings 36, the first washer 32, the connecting member 33, the stationary washer 35, the rotating washer 34, the flange 310, and the frame 20 together cooperatively provide an amount of friction that allows movement of the display body 203 relative to the main body 201 when applied a moderate force, and that also allows the display body 203 to be stably maintained in a desired position relative to the main body 201.

When a force is applied on the display body 203 to drive the display body 203 rotate along the second line B-B, the display body 203 drives the pivotal shaft 51 to rotate relative to the second line B-B. Simultaneously, the pivotal shaft 51 drives the second limiting washer 522, the stationary washer 54, the washer 56, and the fixing element 57 to rotate.

At a first position, the protrusion 542 is received in the depression 533, the tab 5221 resists the limiting latching tab 5211.

When the display body 203 rotates along the second line B-B, the protrusions 542 gradually slide out of the depressions 533 and resist other portions of the rotating washer 53. Because the axial force from the resilient rings 55, the rotating washer 53 and the stationary washer 54 together cooperatively help providing an amount of friction that allows movement of the display body 203 relative to the main body 201 when applied a moderate force, and that also allows the display body 203 to be stably maintained in a desired position relative to the main body 201.

At the same time, after the display body rotates 180 degrees, the protrusions 542 are latched in the depressions 533 again, as a result, the display body 203 remains in a stable position again.

When the protrusions 542 slide out of the depressions 533, the tab 5221 resists another limiting latching tab 5211 of the first limiting washer 521, thereby limiting the rotatable angle of the display body 203 relative to the second line B-B.

It can be understood that, the limiting latching tab 5211 can also be integrally formed with the connecting portion 602 of the supporting body 60 to form the limiting protrusion, and the tab 5221 can also be a protrusion formed on a side surface of the resisting portion 513. In addition, the limiting member 52 can be omitted, thus the hinge assembly 100 can rotate 360 degrees relative to the second line B-B.

It can be understood that, one of the two pivot mechanisms 30 can be omitted, and the washer 56 can be omitted. In addition, the protrusion 511 can also be welded on the frame 20 directly. As a result, there is no need to define the through hole 211 in the frame 20.

Finally, while various embodiments have been described and illustrated, the invention is not to be construed as being limited thereto. Various modifications can be made to the embodiments by those of ordinary skill in the art without departing from the true spirit and scope of the present disclosure as defined by the appended claims.

What is claimed is:

1. A hinge assembly, comprising:
   a first rotating module comprising:
      a frame; and
      a pivot mechanism positioned on the frame; and
   a second rotating module comprising:
      a supporting body;
      a first pivotal shaft having a deformed shaft portion;
      a first rotating washer;
      a first stationary washer;
      a first limiting washer;
      a second limiting washer;
      a resilient ring, and
      a first fixing element, wherein a first end of the first pivotal shaft is fixed on the frame, the supporting body defines a receiving hole, the supporting body comprises a flat portion and a connecting portion, the receiving hole communicates between the connecting portion and the flat portion; the connecting portion defines two latching grooves, wherein the supporting body, the first rotating washer, the first stationary washer, the resilient ring, and the first fixing element are orderly sleeved on a second end, opposite to that of the first end, of the first pivotal shaft; the first fixing element prevents the supporting body, the first rotating washer, the first stationary washer, and the resilient rings from detaching from the first pivotal shaft, one of the first rotating washer or the first stationary washer forms at least one protrusion, and the other washer defines at least depression for receiving the at least one protrusion; the first pivotal shaft is configured to drive the first stationary washer to rotate; the first limiting washer forms two limiting latching tabs, the limiting latching tabs are latched in the latching grooves of the supporting body; and the second limiting washer forms a tab, the second limiting washer is non-rotatably sleeved on the first pivotal shaft.

2. The hinge assembly as claimed in claim 1, wherein the first rotating washer and the first stationary washer are substantially ring-shaped, the at least one depression is defined in the first rotating washer, the at least one protrusion is formed on the first stationary washer.

3. The hinge assembly as claimed in claim 1, wherein the first pivotal shaft forms a thread in an end that is away from the frame, the first fixing element is a nut, the first fixing element engages with the thread of the first pivotal shaft.

4. The hinge assembly as claimed in claim 1, wherein an inner surface of the receiving hole of the supporting body defines two depressions, a periphery of the first rotating washer forms two tabs, the tabs of the rotating member are received in the depressions of the receiving hole, thereby the first rotating washer is non-rotatably received in the receiving hole of the supporting body, the first stationary washer is non-rotatably sleeved on the first pivotal shaft.

5. The hinge assembly as claimed in claim 1, wherein the second rotating module further comprises a washer sleeved on the first pivotal shaft between the resilient rings and the first fixing element.

6. The hinge assembly as claimed in claim 5, wherein the stationary washer defines the deformed hole in middle portion thereof, the deformed shaft portion is engaged in the deformed hole of the washer.

7. The hinge assembly as claimed in claim 1, wherein the pivot mechanism includes a second pivotal shaft, a connecting member, a second stationary washer, a second rotating washer, a resilient ring, a washer, and a second fixing element; one end of the second pivotal shaft is non-rotatably fixed on the frame; the connecting member, the second stationary washer, the second rotating washer, the resilient ring, and the washer are sleeved on the other end of the second pivotal shaft in that order; the second fixing element prevents the connecting member, the second stationary washer, the second rotating washer, the resilient ring, and the washer detaching from the second pivotal shaft; the connecting member and the second rotating washer are rotational relative to the second pivotal shaft; the second stationary washer is un-rotatable relative to the second pivotal shaft.

8. A hinge assembly, comprising:
   a first rotating module comprising:
      a frame; and
      two pivot mechanisms positioned on the frame; and
   a second rotating module comprising:
      a supporting body;
      a first pivotal shaft having a deformed shaft portion;
      a first rotating washer;
      a first stationary washer;
      a first limiting washer;
      a second limiting washer;
      a resilient ring, and
      a first fixing element, wherein one end of the first pivotal shaft fixed on the frame, the supporting body defines a receiving hole, the supporting body comprises a flat portion and a connecting portion, the receiving hole communicates between the connecting portion and the flat portion; the connecting portion defines two latching grooves, and the supporting body, the first rotating washer, the first stationary washer, the resilient ring, and the first fixing element are orderly sleeved on the other end of the first pivotal shaft; the first fixing element prevents the supporting body, the first rotating washer, the first stationary washer, and the resilient rings from detaching from the first pivotal shaft, one of the first rotating washer or the first stationary washer forms at least one protrusion, the other washer defines at least depression for receiving the at least one protrusion, the first pivotal shaft is configured to drive the first stationary washer to rotate; the first limiting washer forms two limiting latching tabs, the limiting latching tabs are latched in the latching grooves of the supporting body; and the second limiting washer forms a tab, the second limiting washer is non-rotatably sleeved on the first pivotal shaft.

* * * * *

UNITED STATES PATENT AND TRADEMARK OFFICE
CERTIFICATE OF CORRECTION

PATENT NO. : 7,979,961 B2
APPLICATION NO. : 12/261232
DATED : July 19, 2011
INVENTOR(S) : Jin-Xin Wang et al.

It is certified that error appears in the above-identified patent and that said Letters Patent is hereby corrected as shown below:

ON THE TITLE PAGE:

Item (73) should read:
(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW).

Signed and Sealed this
Thirteenth Day of September, 2011

David J. Kappos
*Director of the United States Patent and Trademark Office*